United States Patent [19]

Maijers et al.

[11] 4,007,405
[45] Feb. 8, 1977

[54] VENT FOR ELECTROLYTIC CAPACITOR HOUSING

[75] Inventors: Andries Cornelis Maijers, Eindhoven; Hendrik Voeten, Zwolle, both of Netherlands

[73] Assignee: U.S. Philips Corporation, New York, N.Y.

[22] Filed: Jan. 2, 1976

[21] Appl. No.: 645,934

Related U.S. Application Data

[63] Continuation of Ser. No. 511,663, Oct. 3, 1974, abandoned.

[30] Foreign Application Priority Data

Oct. 15, 1973 Netherlands ................. 7314130

[52] U.S. Cl. ................. 317/230; 317/242; 29/570
[51] Int. Cl.² ............... H01G 9/00; H01G 9/16; B01J 17/00
[58] Field of Search ........... 317/230, 242; 29/570

[56] References Cited

UNITED STATES PATENTS 2,129,089  9/1938  Hood ........................ 317/230

FOREIGN PATENTS OR APPLICATIONS 624,066  1/1936  Germany ................. 317/230
419,356  3/1947  Italy ........................ 317/230
528,977  11/1940  United Kingdom ....... 317/230

Primary Examiner—Andrew J. James
Attorney, Agent, or Firm—Frank R. Trifari; Daniel R. McGlynn

[57] ABSTRACT

An electrolytic capacitor comprising at least two rills which are adjacently arranged and which extend along the circumference of the capacitor housing. The rills are separated by an intermediate ridge. The ridge is provided with at least one opening which constitutes a valve in conjunction with an elastic band or ring tensioned about the ridge.

1 Claim, 2 Drawing Figures

VENT FOR ELECTROLYTIC CAPACITOR HOUSING

This is a continuation, of application Ser. No. 511,663, filed Oct. 3, 1974 now abandoned The invention relates to an electrolytic capacitor comprising a capacitor body, accommodated in a cylindrical housing, and at least one seat, extending in the circumferential direction of the housing, for positioning an elastic band or ring which closes one or more openings provided in the seat.

In a known capacitor of the kind set forth (Austrian Patent Specification 136,252) the said openings are provided in the bottom (viewed from the outside) of a singular rill or groove which serves as a seat for an elastic ring and which is provided in the wall of the capacitor housing. In conjunction with the openings, the elastic ring constitutes a so-termed relief valve. As is known, such valves are required in many electrolytic capacitors in view of undesired pressure increases liable to occur therein because of the so-termed forming, chemical reactions in the capacitor and the vapour pressure of the electrolyte.

A drawback of the described capacitor is that the capacitor body or the capacitor roll is liable to close the openings provided in the rill so that the valve action is lost. The closing of the openings in the rill can be caused, for example, by the swelling of the capacitor body due to the impregnation with electrolyte. However, it may also occur that rills provided in the wall of the capacitor housing (longitudinal rills or circumferential rills) — serving for positioning the capacitor body in the housing — force the capacitor in a tilted position, so that the openings are closed.

A further drawback of the known capacitors is that — depending on the position in which the capacitor is used and on the position of the rill — electrolyte can escape from the housing via the openings provided in the rill. This drawback is notably encountered when the capacitor is mounted horizontally.

The invention has for its object to provide an electrolytic capacitor in which the closing of the valve openings on the inside by the capacitor body is precluded and which is insusceptible to the position in which it is used.

To this end, an electrolytic capacitor according to the invention is characterized in that the said seat is formed by at least two adjacent circumferential rills separated by an intermediate ridge provided with one or more openings closed by the band or rings.

The invention will be described in detail hereinafter with reference to the drawing.

Figure 1:
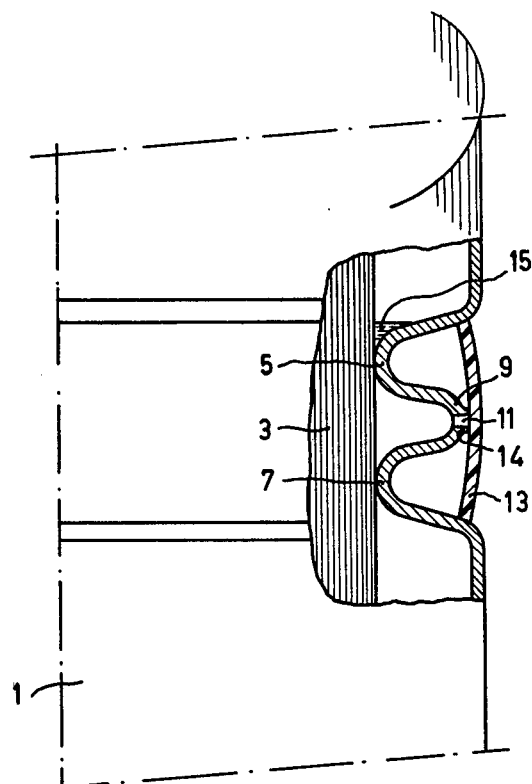
FIG. 1 is partly a front view and partly a sectional view of an essential part of a preferred embodiment of a capacitor according to the invention in the upright position.

The capacitor shown in FIG. 1 comprises a cylindrical metal housing 1 accommodating a capacitor roll 3 impregnated with a suitable liquid electrolyte and having a mainly cylindrical shape. The housing 1 is made, for example, of aluminium, but may alternatively be made of other metals and synthetic materials such as polypropylene. Provided along the circumference of the housing 1 are two adjacent rills 5 and 7, separated by an intermediate ridge 9 (viewed from the inside). Provided in the ridge are one or more openings 11 which are arranged along the circumference of the housing 1 in a regular or irregular manner. The rills 5 and 7, the ridge 9 and the openings 11 are provided in the housing before the capacitor roll is slid therein. The openings 11 in the ridge 9 are closed by means of an annular elastic band 13. The wall of the housing is preferably provided with a bearing edge 14 which envelops the opening 11 and on which the band 13 can bear. The band 13 is preferably made of an elastomer synthetic material such as polyethylene rubber or butyl rubber. When the bearing pressure of the band 13 on the bearing edge 14 and the proportioning of the openings 11 are suitably chosen, the pressure can be chosen at which timely relieving is ensured. Depending on the material of the band 13, it is either shrunk onto the ridge 9 or is first elastically stretched and subsequently slid about the housing 1 until it rests on the ridge 9. The height of the ridge 9, the depth of the rills 5 and 7 and the width of the band 13 are preferably chosen such that the band 13 bears on the walls of the rills 5 and 7 and does not project beyond the jacket surface of the housing 1. The depth of the rills 5 and 7 can also be chosen such that the rills serve for positioning the roll 3 in the housing 1. Longitudinal rills in the longitudinal direction of the housing can thus be dispensed with.

Figure 2:
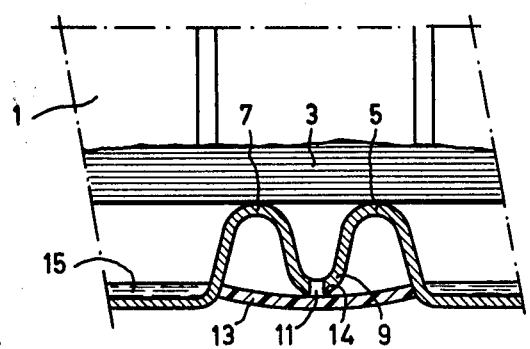
FIG. 2 shows a capacitor as shown in FIG. 1 in the horizontal position.

It will be obvious that swelling of the capacitor body as well as any positioning thereof in the housing can no longer cause the openings 11 to be closed from the inside. This is also applicable if the capacitor body is constructed as a so-termed folding capacitor. The risk of leakage of the electrolyte to the outside has been substantially reduced with respect to known capacitors. In the vertical position of the capacitor shown in FIG. 1, the electrolyte can collect above the rill 5 at the area denoted by the reference 15. Even if some leakage should occur along the rill 5, the electrolyte will not reach the openings 11, but will rather flow downwards in the housing. In capacitors for upright mounting, moreover, the rills 5 and 7 can be provided in the upper part of the housing, so that only a minimum quantity can collect at the area 15. In the horizontally mounted capacitor shown in FIg. 2, the electrolyte generally cannot reach such a level that there is a risk of leakage, because the electrolyte is spread over a comparatively large volume (with respect to the upright position) and would have to creep up on the rill 5 on the one side and the rill 7 on the other side. According to the invention, a capacitor is thus obtained which is also less sensitive to the position in which it is mounted than the known capacitors.

What is claimed is:
1. In a capacitor the combination comprising:
a capacitor element;
a metal housing of said capacitor element including two parallel rills extending peripherally around at least a first portion of said housing and formed in a direction interior of said housing, thereby forming two troughs with respect to the exterior of said housing, and a ridge extending circumferentially around at least a second portion of said housing intermediate said two rills and extending in a direction substantially radial to said housing to a point not greater than the extended cylindrical surface of said housing, said ridge being provided with openings therein at the apex of said ridge and spaced apart from said capacitor element for preventing closing of said openings by said capacitor element; and
an elastic band extending peripherally around said housing for sealing said openings, said band having a width exceeding the distance between said two troughs formed by said two parallel rills, and having a concave cross-section with respect to said capacitor element.

* * * * *